United States Patent
Tanimoto et al.

(10) Patent No.: US 7,456,899 B2
(45) Date of Patent: Nov. 25, 2008

(54) IMAGING APPARATUS AND CONTROL CIRCUIT OF IMAGING DEVICE

(75) Inventors: Takashi Tanimoto, Motosu-gun (JP); Tomomichi Nakai, Hashima-gun (JP)

(73) Assignee: Sanyo Electric Co., Ltd., Osaka (JP)

(*) Notice: Subject to any disclaimer, the term of this patent is extended or adjusted under 35 U.S.C. 154(b) by 628 days.

(21) Appl. No.: 11/187,022

(22) Filed: Jul. 22, 2005

(65) Prior Publication Data
US 2006/0028578 A1 Feb. 9, 2006

(30) Foreign Application Priority Data
Aug. 5, 2004 (JP) ............... 2004-229869

(51) Int. Cl.
*G03B 7/00* (2006.01)
*H04N 5/235* (2006.01)
(52) U.S. Cl. .................. 348/362; 348/229.1
(58) Field of Classification Search ........... 348/229.1, 348/363, 221.1, 255, 528, 208.12, 362, 367
See application file for complete search history.

(56) References Cited

U.S. PATENT DOCUMENTS

| | | | | |
|---|---|---|---|---|
| 5,621,462 A | * | 4/1997 | Takahashi et al. | 348/363 |
| 5,831,676 A | * | 11/1998 | Takahashi et al. | 348/362 |
| 6,137,533 A | * | 10/2000 | Azim | 348/222.1 |
| 6,630,960 B2 | * | 10/2003 | Takahashi et al. | 348/364 |
| 6,650,364 B1 | | 11/2003 | Itani et al. | |
| 6,750,906 B1 | * | 6/2004 | Itani et al. | 348/229.1 |
| 7,289,145 B2 | * | 10/2007 | Johnson et al. | 348/229.1 |
| 2002/0176009 A1 | * | 11/2002 | Johnson et al. | 348/229 |
| 2003/0184661 A1 | * | 10/2003 | Yubata et al. | 348/229.1 |
| 2006/0055795 A1 | * | 3/2006 | Nakai et al. | 348/229.1 |

* cited by examiner

*Primary Examiner*—Lin Ye
*Assistant Examiner*—Marly Camargo
(74) *Attorney, Agent, or Firm*—Oliff & Berridge, PLC

(57) ABSTRACT

In exposure control of an imaging apparatus, if a vertical scanning period is enlarged to increase an exposure time when the exposure time reaches an upper limit value, there occurs a problem in that a frame rate is reduced. Accordingly, when a subject is dark, an auto exposure control circuit sets the vertical scanning period V to a standard value Vst, increases the exposure time E to the upper limit value Emax (P60) and then increases a gain α of an AGC circuit (P62). If the image is still dark even when the gain α reaches the upper limit value α max, the auto exposure control circuit switches the vertical scanning period V to an enlarged value Vex and thus more increases the exposure time E (P64).

6 Claims, 4 Drawing Sheets

IMAGING APPARATUS AND CONTROL CIRCUIT OF IMAGING DEVICE

FIELD OF THE INVENTION

The present invention relates to an imaging apparatus for photographing a subject, and more particularly, to an exposure control for controlling a level of an image signal in accordance with brightness of a subject.

BACKGROUND OF THE INVENTION

In an imaging apparatus, such as a digital camera, an image signal output from an image device, such as a CCD (charge coupled device) image sensor, has a low signal level when a subject is dark. Accordingly, an influence of a noise component due to a dark current or random noise included in the image signal increases and thus an S/N ratio (signal to noise ratio) is deteriorated. On the other hand, if the subject is bright and the signal level is high, a dynamic range of the image signal is suppressed by saturation of a light receiving pixel, a CCD shift register or the like.

For this reason, in order to maintain the signal level of the obtained image signal in a preferable range even in a case in which the brightness of the subject is changed, an auto exposure control is performed. This auto exposure control is performed by expanding/contracting an exposure time of the imaging device. Alternatively, the level of the image signal may be controlled by controlling a gain of the image signal in an image signal processing circuit for processing the image signal.

In the latter, the image signal processing circuit includes an analog signal processing circuit which processes an analog image signal output from the imaging device and a digital signal process circuit which is provided at a rear stage thereof and processes the image signal after A/D conversion, and the gain is controlled in the respective circuits. Specifically, in the analog signal processing circuit, an auto gain control (AGC) circuit for amplifying the image signal by a variable gain (analog gain) is provided. On the other hand, in the digital signal processing circuit, a digital gain control (DGC) circuit for multiplying the A/D converted image data by a variable gain (digital gain) is provided.

In the image signal processing circuit, the image data output from the DGC circuit is subjected to an integration operation for one screen, and the auto exposure control circuit controls a driving unit of the imaging device to expand/contract the exposure time based on the integration result, or controls each gain of the AGC circuit and the DGC circuit, and performs a feedback control such that an average level of one screen of the image signal becomes a desired level.

Here, the process of multiplying the image signal by the gain using the AGC circuit or the DGC circuit also amplifies the noise component. On the contrary, the expansion of the exposure time has a small influence on the increase of the noise. For this reason, if the subject is dark, the exposure time is first increased, and, if the level of the image signal is low even though the exposure time becomes an upper limit value, the gains of the AGC circuit and the DGC circuit are increased. On the other hand, in a case of decreasing the level of the image signal, the gains of the AGC circuit and the DGC circuit are decreased, and, if the level of the image signal is too high even though the gains of the AGC circuit and the DGC circuit are set to a lower limit value, the exposure time is shortened.

As described above, when the level of the image signal is increased, the increase of the gains of the AGC circuit and the DGC circuit is disadvantageous in maintaining the S/N ratio. Accordingly, the exposure time is expanded prior to the increase of the gains. However, since the imaging apparatus photographs a moving image for a predetermined frame period according to a vertical scanning period V, the settable exposure time has the upper limit determined according to the vertical scanning period V.

As regard this, there is an idea that the vertical scanning period should be enlarged such that the exposure time is more expanded, if the exposure time reaches the upper limit according to any vertical scanning period V. FIG. 1 is a state transition diagram illustrating a conventional exposure control technology based on the above idea. In FIG. 1, a horizontal axis represents a total gain G of the exposure control and a right direction represents a direction that the gain increases. The total gain corresponds to a product of the exposure gain according to the expansion/contraction of the exposure time and each processing gain of the AGC circuit and the DGC circuit. Also, a plurality of control states for performing the exposure control are arranged deviated in a vertical direction. In order to increase the signal level to a target level, an iris control operation P2 for expanding the exposure time E is performed. If the exposure time E reaches an upper limit value Emax, an enlarged iris control operation P4 for enlarging the vertical scanning period V from a standard value Vst to a value Vex is performed. In the enlarged iris control operation P4, the exposure time E can be expanded from the upper limit value Emax set in the iris control operation P2 to an upper limit value Emax' according to a new vertical scanning period Vex. In the enlarged iris control operation P4, if the signal level is not enough even though the exposure time E reaches the upper limit value Emax', the AGC operation P6 is performed and thus the gain thereof is increased from a standard value. In addition, if the signal level is not enough even though the gain of the AGC operation P6 is set to the upper limit value, the DGC operation P8 is performed and thus the gain thereof is increased from a standard value.

In the exposure control, as the subject becomes dark, the total gain of the auto exposure control operation is needed. That is, in FIG. 1, the left side is the side that the subject is bright and the right side is the side that the subject is dark. In the conventional technology, if the subject becomes dark, the enlarged iris control operation P4 is performed before the gain of the AGC circuit or the DGC circuit is varied. That is, in a step that the subject is relatively bright, the vertical scanning period is enlarged and thus a frame rate is reduced. For example, in photographing a still image, a relative large photographing interval is allowed. But, in photographing a moving image or preview, the above-mentioned technology may be disadvantageous, because it is important that the image is smoothly in accordance with the motion of the subject.

SUMMARY OF THE INVENTION

Accordingly, the invention has been made up to solve the above-mentioned problems, and it is an object of the present invention to provide exposure control which can ensure a frame rate and adequately prevent an S/N ratio from deteriorating in an imaging apparatus.

According to one aspect of the invention, there is provided an imaging apparatus including: an imaging device that photographs a subject and generates an image signal; a driving unit that repeatedly drives the imaging device in a predetermined frame period; a signal processing unit that performs a predetermined signal processing to the image signal and generates an output image signal; and an exposure control unit that feedback-controls a signal level of the output image signal. The driving unit expands/contracts an exposure time in a range according to the frame period and increases/decreases an exposure gain, and the signal processing unit has at least one front-stage gain control circuit for multiplying the image signal by a processing gain in a predetermined range. The exposure control unit sets to a total gain of the output image signal according to a product of the exposure gain and the processing gain first to third sections in ascending order, in the first section, sets the frame period to a standard period and controls the total gain by increasing/decreasing the exposure gain by the driving unit, in the second section, controls the total gain by increasing/decreasing the processing gain of the at least one front-stage gain control circuit, and, in the third section, sets the frame period to an enlarged period larger than the standard period and controls the total gain by increasing/decreasing the exposure gain by the driving unit.

Preferably, the signal processing unit has a rear-stage gain control circuit for multiplying the image signal by a processing gain in a predetermined range, and the exposure control unit controls the total gain by increasing/decreasing the processing gain of the rear-stage gain control circuit in a fourth section arranged next to the third section.

According to another aspect of the present invention, there is provided an imaging apparatus including: an imaging device that photographs a subject and generates an image signal; a driving unit that repeatedly drives the imaging device in a predetermined frame period; a signal processing unit that performs a predetermined signal processing to the image signal and generates an output image signal; an exposure control unit that feedback-controls a signal level of the output image signal according to any one of two predetermined control modes; and a switching unit that switches the control modes. The driving unit expands/contracts an exposure time in a range according to the frame period and increases/decreases an exposure gain, and the signal processing unit has a front-stage gain control circuit for multiplying the image signal by a front-stage processing gain in a predetermined range, and a rear-stage gain control circuit for multiplying the image signal by a rear-stage processing gain in a predetermined range. The exposure control unit sets to a total gain of the output image signal according to a product of the exposure gain, the front-stage processing gain, and the rear-stage processing gain, first to fourth sections in ascending order with respect to the respective control modes, in a first control mode, in the first section, sets the frame period to a standard period and performs a standard exposure time control for controlling the total gain by increasing/decreasing the exposure gain by the driving unit, in the second section, sets the frame period to an enlarged period larger than the standard period and performs an enlarged exposure time control for controlling the total gain by increasing/decreasing the exposure gain by the driving unit, in the third section, performs a front-stage processing gain control for controlling the total gain by increasing/decreasing the front-stage processing gain, and, in the fourth section, performs a rear-stage processing gain control for controlling the total gain by increasing/decreasing the rear-stage processing gain. In a second control mode, the exposure control unit performs the control process performed in the four sections in different order from the first control mode. That is, as one embodiment of the second control mode, in the first section, it performs the standard exposure time control, in the second section, performs the front-stage processing gain control, in the third section, performs the rear-stage processing gain control, and, in the fourth section, performs the enlarged exposure time control. Alternatively, in a second control mode, in the first section, it performs the standard exposure time control, in the second section, performs the front-stage processing gain control, in the third section, performs the enlarged exposure time control, and, in the fourth section, performs the rear-stage processing gain control.

According to a further aspect of the invention, there is provided a control circuit of an imaging device which is combined with the imaging image for photographing a subject and generating an image signal to constitute the imaging apparatus.

DESCRIPTION OF THE PREFERRED EMBODIMENTS

Hereinafter, preferred embodiments of the present invention will now be described with reference to the accompanying drawings.

Figure 2:
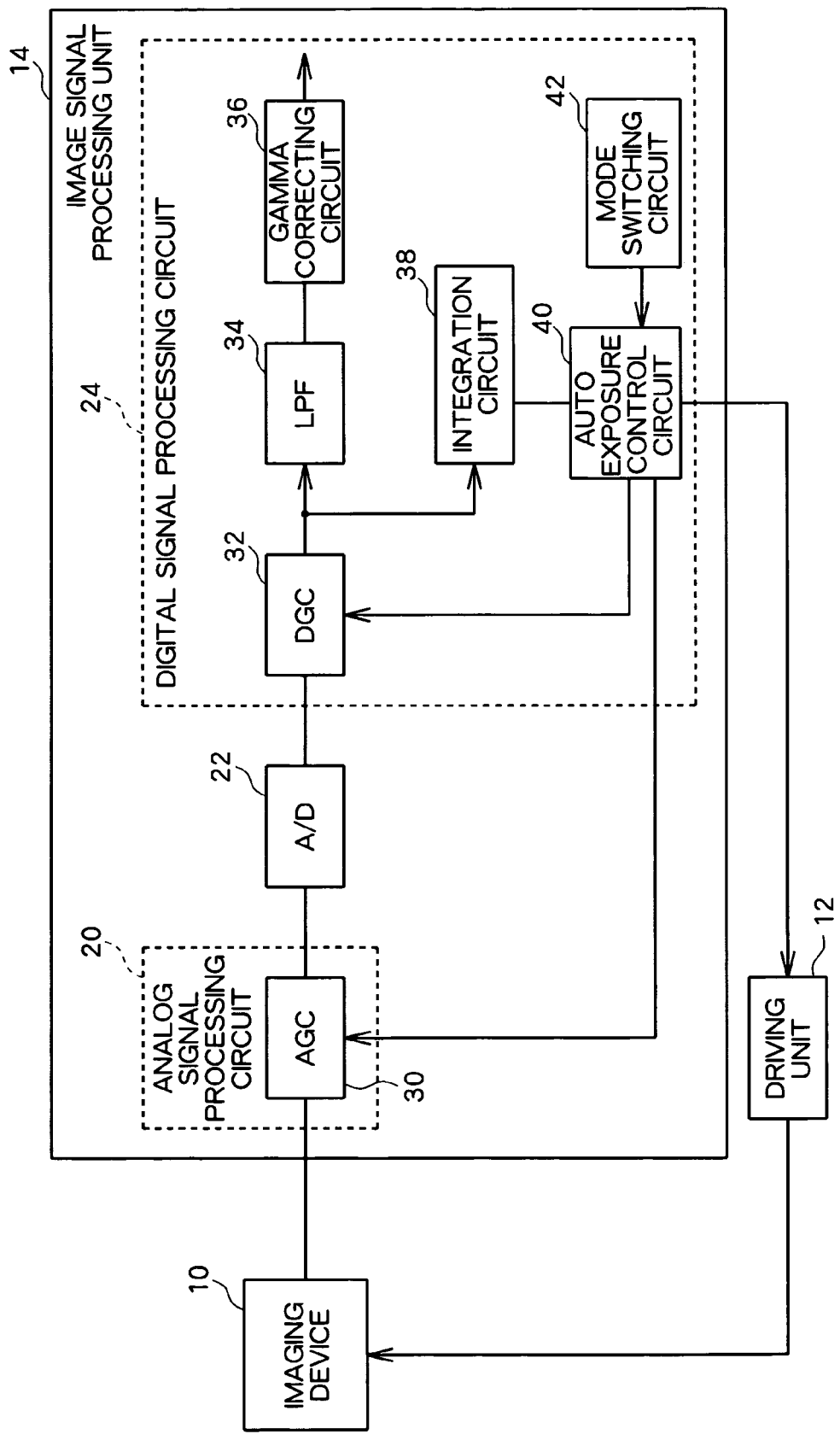
FIG. 2 is a block diagram schematically illustrating the structure of an imaging apparatus according to an embodiment of the present invention.

FIG. 2 is a block diagram schematically illustrating the structure of an imaging apparatus according to an embodiment of the present invention. This imaging apparatus includes an imaging device 10, such as a CCD image sensor, a driving unit 12 for driving the imaging device 10, and an image signal processing unit 14. As described below, the driving unit 12 and the image signal processing unit 14 have a control circuit function for controlling a level of an image signal obtained from the imaging device 10.

The image signal processing unit 14 generates a luminance signal based on the image signal output from the imaging device 10 to output it to a display device (not shown) and determines the exposure state to control the driving unit 12 for driving the imaging device 10. The image signal input from the imaging device 10 to the image signal processing unit 14 is input to an analog signal processing circuit 20.

The analog signal processing circuit 20 includes an AGC circuit 30 for amplifying the image signal by a variable processing gain (analog gain) and performs an auto gain control. Also, the analog signal processing circuit 20 performs a sample and hold process to the image signal. An A/D converting circuit 22 converts the image signal output from the analog signal processing circuit 20 into digital data and outputs image data.

A digital signal processing circuit 24 receives the image data from the A/D converting circuit 22 and performs various processes. Here, the digital signal processing circuit 24 includes a DGC circuit 32 for multiplying the image data by a processing gain (digital gain) to perform amplifying operation. Further, the digital signal processing circuit 24 includes a low pass filter (LPF) 34. The LPF 34 extracts a luminance signal component from the image signal obtained from the imaging device 10 and removes a noise component such as moiré noise, random noise, and crosscut noise. The output of the DGC circuit 32 is input to the LPF 34 and the luminance signal component extracted from the LPF 34 is input to a gamma correcting circuit 36 as the image data.

The gamma correcting circuit 36 performs a tone correction for converting the signal level of the image data from the LPF 34 based on a non-linear converting characteristic.

An integration circuit 38 performs an integration operation to the image data output from the DGC circuit 32 for each screen and an auto exposure control circuit 40 expands/contracts an exposure time E based on the integration result. The driving unit 12 receives the result of the exposure time control operation of the auto exposure control circuit 40 and controls a timing of an electronic shutter operation in the imaging device 10 to realize the imaging operation at a target exposure time. Also, the driving unit 12 changes a vertical scanning period under the control of the auto exposure control circuit 40. For example, a vertical scanning period V is defined as the count number of a pulse HD for each horizontal scanning period and is changed by changing the count number which is set in a register. Here, a standard vertical scanning period is represented by Vst and an enlarged vertical scanning period is represented by Vex.

Further, the auto exposure control circuit 40 controls a processing gain (analog gain $\alpha$) for the image signal of the AGC circuit 30 and a processing gain (digital gain $\beta$) multiplied with the image data of the DGC circuit 32, based on the integration result of the integration circuit 38. The auto exposure control circuit 40 can provide three control modes, as described below, and a mode switching circuit 42 applies a mode switching signal to the auto exposure control circuit 40.

For example, the mode switching circuit 42 can generate a mode switching signal according to a selection operation of a user such as a switching operation.

Figure 1:
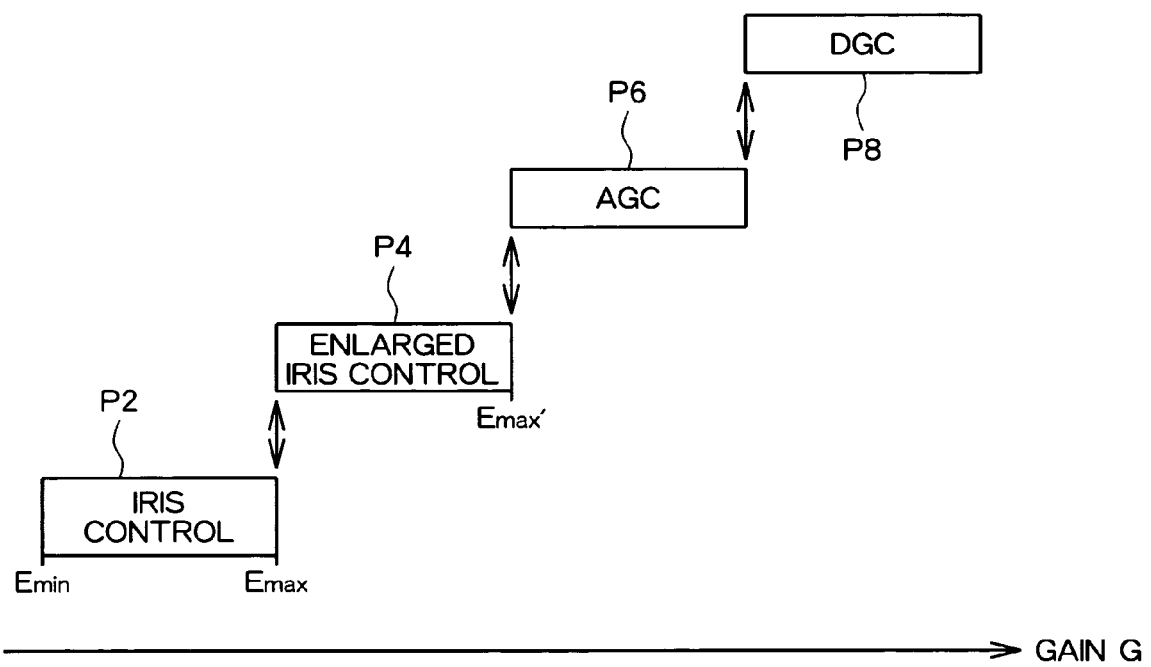
FIG. 1 is a state transition diagram illustrating a conventional exposure control technology.
Figure 3:
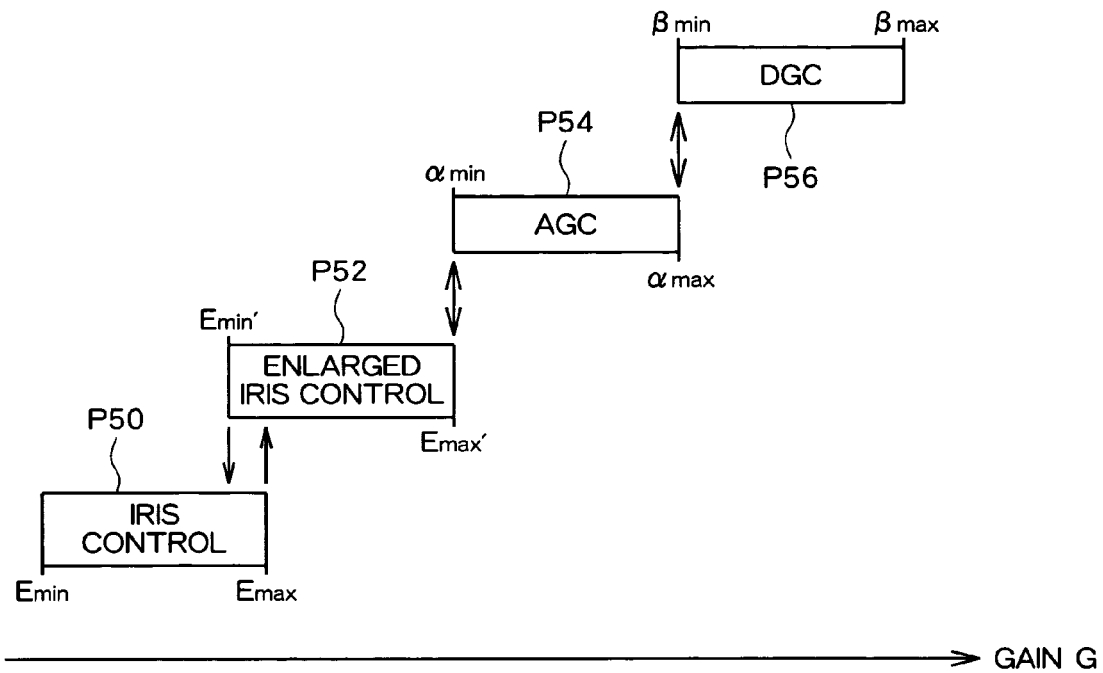
FIG. 3 is a state transition diagram illustrating an exposure control operation of a first control mode.

Next, the exposure control operation of the auto exposure control circuit 40 will be described. Among three control modes, a first control mode is basically the same as that described in FIG. 1, and, herein, will be described in more details. FIG. 3 is a state transition diagram illustrating an exposure control operation of the first control mode. In FIG. 3, a horizontal axis represents a total gain G of the exposure control and a right direction is a direction that the gain increases. This total gain G corresponds to a product of the exposure time E and the gains $\alpha$ and $\beta$.

The auto exposure control circuit 40 switches four exposure control states for performing an iris control P50, an enlarged iris control P52, an AGC operation P54, and a DGC operation P56 according to the gain.

Here, the state transition between the iris control P50 and the enlarged iris control P52 is likely to be unstable, because the vertical scanning period V is discontinuously switched. Accordingly, in order to ensure the stability, hysteresis is provided in the transition between the control operations P50 and P52. Specifically, in the procedure of increasing the gain G, if the vertical scanning period V is set to a standard value V and the exposure time E is increased to Emax (control operation P50), the auto exposure control circuit 40 switches the vertical scanning period V to an enlarged value Vex and further increases the exposure time E from the Emax (control operation P52) so as to increase the total gain G. On the other hand, in the procedure of decreasing the gain G, the exposure time E is decreased to the lower limit value Emin' in a state in which the vertical scanning period V is set to the enlarged value Vex (control operation P52). In order to form the hysteresis, the lower limit value Emin' is set to be smaller than the upper limit value Emax of the control operation P50. If the exposure time reaches Emin' (control operation P52), the vertical scanning period V is switched to the standard value Vst and the exposure time E is more decreased from Emin' (control operation P50). That is, Emax and Emin' deviates from each other by $\Delta E$ (=Emax−Emin') and $\Delta E$ is determined such that the stability of the state transition between the control operations P50 and P52 is obtained.

In the procedure of increasing the gain G after the control operation P52, first, in the control operation P52, the exposure time is increased to the upper limit value Emax' and the exposure control state is then transited to the control operation P54. In the control operation P54, the gain $\alpha$ is increased from $\alpha$min of the current state while maintaining V=Vex and E=Emax'. If $\Delta$ reaches $\alpha$max, the exposure control state is transited to the control operation P56. In the control operation P56, the gain $\beta$ is increased from $\beta$min of the current state to the upper limit value $\beta$max while maintaining V=Vex, E=Emax', and $\alpha$=$\alpha$max. On the other hand, in the procedure of decreasing the gain G, the control operations are performed in the order of the control operations P56, P54, and P52, reverse to the increasing procedure. The control operation from the control operation P52 to the control operation P50 is described above.

Figure 4:
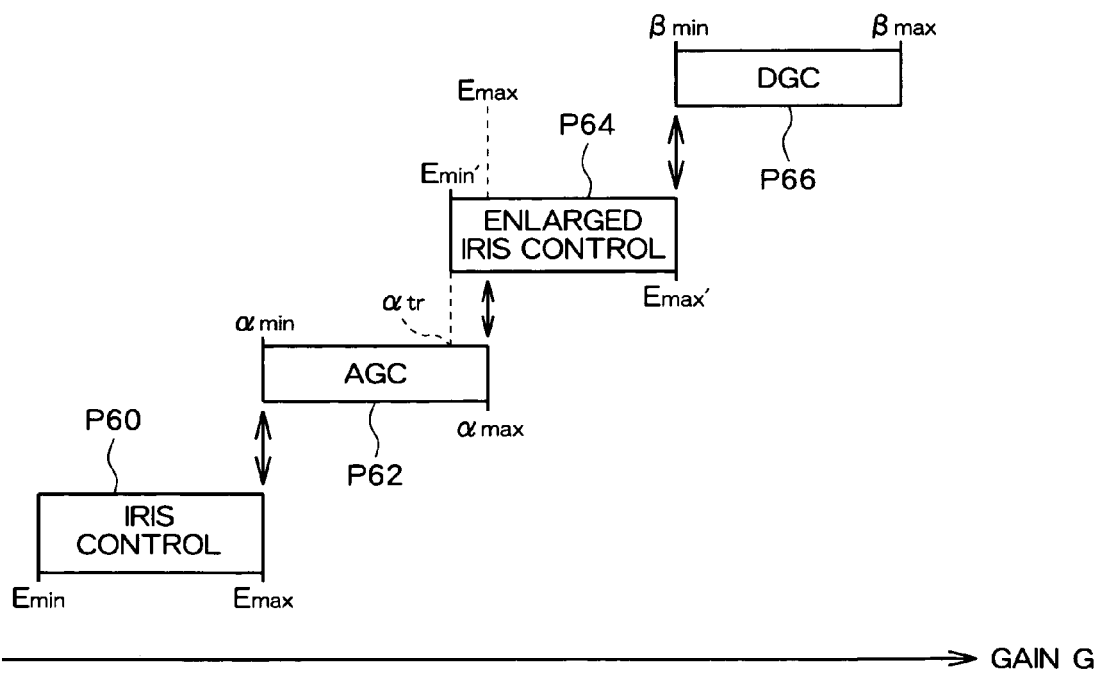
FIG. 4 is a state transition diagram illustrating an exposure control operation of a second control mode.

FIG. 4 is a state transition diagram illustrating exposure control operation of the second control mode. In this control mode, in the procedure of increasing the gain G, four exposure control operations are performed in the order of an iris control operation P60, an AGC operation P62, an enlarged iris control operation P64, and a DGC operation P66, and, in the procedure of decreasing the gain G, the exposure control operations are performed in the reverse order. Even in this case, the hysteresis is formed in the control operation so as to ensure stability when switching the vertical scanning period. In this control mode, since the vertical scanning period is switched between the control operations P62 and P64, the hysteresis is formed in the transition between the two control states.

The second control mode will be described in more detail. In the increasing procedure, first, the auto exposure control circuit 40 sets the vertical scanning period V to the standard value Vst and increases the exposure time E. If the exposure time E reaches Emax (control operation P60), the auto exposure control circuit 40 increases the gain $\alpha$ from $\alpha$min of the current state to the upper limit value $\alpha$max while maintaining E=Emax (control operation P62). If $\alpha$ reaches $\alpha$max, the auto exposure control circuit 40 switches the vertical scanning period V to the enlarged value Vex and increases the exposure time E from Emax to the upper limit value Emax' (control operation P64). If the exposure time E reaches the upper limit value Emax' (control operation P64), the auto exposure control circuit 40 increases the gain $\beta$ from $\beta$min of the current state to the upper limit value $\beta$max while maintaining V=Vex, E=Emax', and $\alpha$=$\alpha$max (control operation P66).

On the other hand, in the decreasing procedure, the exposure control operation from the control operation P66 to the control operation P64 and the exposure control operation from the control operation P62 to the control operation P60 are performed in the procedure reverse to the increasing procedure. As described above, the hysteresis is formed in the transition of the control operation P64 to the control operation P62. Specifically, in this transition, the auto exposure control circuit 40 decreases the exposure time E to Emax in a state in which the vertical scanning period V is set to the enlarged value Vex (control operation P64). If the exposure time reaches Emax, the auto exposure control circuit 40 decreases the gain $\alpha$ from $\alpha$max of the current state to $\alpha$tr while maintaining V=Vex and E=Emax (P62). For example, $\alpha$tr is determined based on that the total gain G at the time of V=Vex, E=Emax, and $\alpha$=$\alpha$tr becomes equal to the total gain G at the time of V=Vex, E=Emin', and $\alpha$=$\alpha$max. If the gain $\alpha$ reaches αtr, the auto exposure control circuit 40 switches the vertical scanning period V to the standard value Vst and further decreases the gain α from αtr while maintaining E=Emax (control operation P62).

Figure 5:
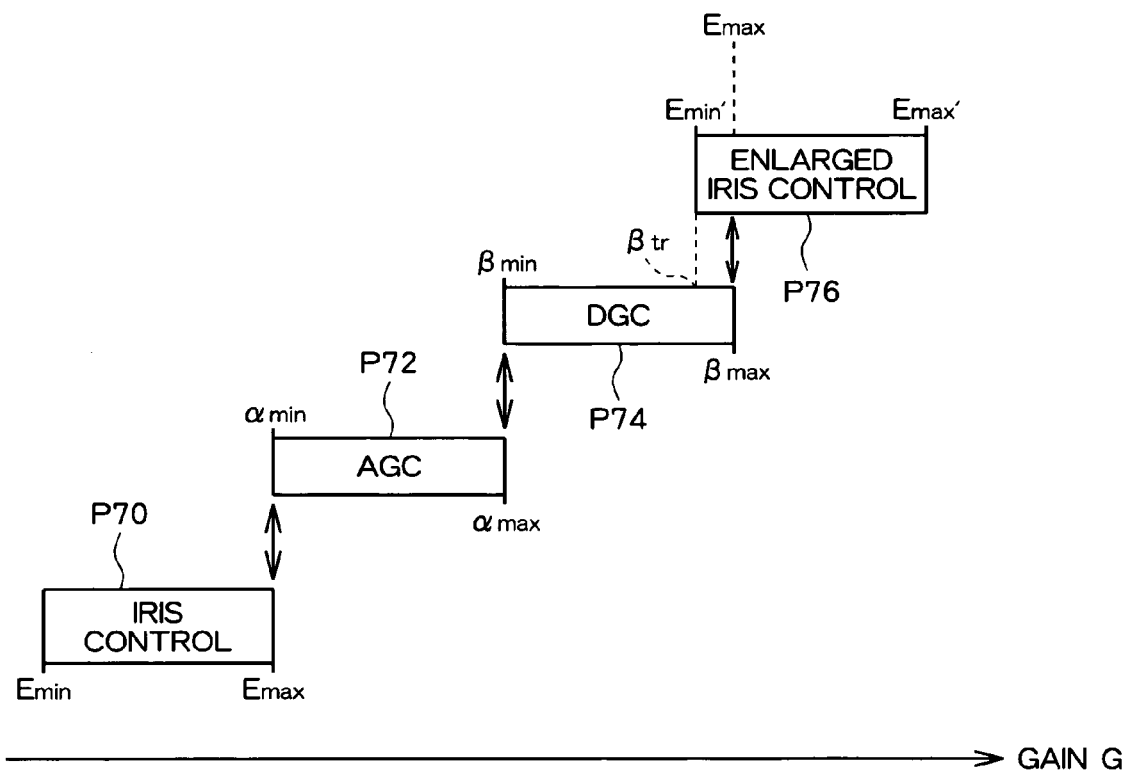
FIG. 5 is a state transition diagram illustrating an exposure control operation of a third control mode.

FIG. 5 is a state transition diagram illustrating an exposure control operation of the third control mode. In this control mode, in the procedure of increasing the gain G, four exposure control operations are performed in the order of an iris control P70, an AGC operation P72, a DGC operation P74, and an enlarged iris control P76, and, in the procedure of decreasing the gain G, the exposure control operations are performed in the reverse order. Even in this case, the hysteresis is formed in the control operation so as to ensure stability when switching the vertical scanning period. In this control mode, since the vertical scanning period is switched between the control operations P74 and P76, the hysteresis is formed in the transition between the two control states.

The third control mode will be described in more detail. In the increasing procedure, first, the auto exposure control circuit 40 sets the vertical scanning period V to the standard value Vst and increases the exposure time E. If the exposure time E reaches Emax (control operation P70), the auto exposure control circuit 40 increases a gain α from αmin of the current state to the upper limit value αmax while maintaining E=Emax (control operation P72). If α reaches αmax, the auto exposure control circuit 40 increases the gain β from βmin of the current state to the upper limit value βmax while maintaining V=Vst, E=Emax, and α=αmax (control operation P74). If β reaches βmax, the auto exposure control circuit 40 switches the vertical scanning period V to the enlarged value Vex and increases the exposure time E from Emax to the upper limit value Emax' (control operation P76).

On the other hand, in the decreasing procedure, the auto exposure control circuit 40 decreases the exposure time E to Emax in a state in which the vertical scanning period V is set to the enlarged value Vex (control operation P76). If the exposure time reaches Emax, the auto exposure control circuit 40 decreases the gain β from βmax to βtr while maintaining V=Vex and E=Emax (P74). For example, βtr is determined based on that the total gain G at the time of V=Vex, E=Emax, and β=βtr becomes equal to the total gain G at the time of V=Vex, E=Emin', and β=βmax. If the gain β reaches βtr, the auto exposure control circuit 40 switches the vertical scanning period V to the standard value Vst and decreases the gain β from βtr while maintaining E=Emax (control operation P74). The exposure control operation from the control operation P74 to the control operation P70 is performed according to the procedure reverse to the increasing procedure.

The three control modes, which are described using FIGS. 3 to 5, are selected by the user through the mode switching circuit 42. When comparing the second control mode with the first control mode, the vertical scanning period becomes the enlarged value Vex in a region where the gain G is high. That is, a range of the gain G that a frame rate becomes decrease in the second control mode is narrower than that of the first control mode and is limited to the side which the subject is darker. Similarly, when comparing the third control mode with the second control mode, a range of the gain G that the frame rate becomes decrease is narrower and is limited to the side which the subject is darker. The second control mode is more suitable than the first control mode and the third control mode is more suitable than the second control mode in the photographing having preference to the frame rate. The three control modes are selected such that the differences thereof are effectively utilized.

For example, in the still image photographing, since the necessity for ensuring the frame rate is low, the first control mode can be used and thus the photographing is performed with good image quality. On the other hand, in the moving image photographing or the preview, since it is preferable that the frame rate does not decrease, the second or third control mode may be employed. For example, if the motion of the subject is relatively slow, the second control mode may be employed and, if the motion of the subject is relatively fast, the third control mode may be employed.

Further, although, in the above-mentioned structure, the gain β of the DGC circuit 32 is controlled after the gain α of the AGC circuit 30 is controlled when the gain G increases, the control order of the gains α and β may be changed. Also, the transitions between the control operations P50 and P52, between the control operations P62 and P64, and between the control operations P74 and P76 may not have the hysteresis.

Moreover, although the above-mentioned structure includes the first to third control modes and switches them to each other, it may include only two control modes including the first control mode and the second control mode and switch them to each other. Also, it may include only two control modes including the first control mode and the third control mode and switch them to each other. In this case, for example, the first control mode may be used in the still image photographing and the second or third control mode may be used in the moving image photographing. In addition, for example, if the imaging apparatus includes only the moving image photographing function without the still image photographing function, any one of the second control mode and the third control mode or combination thereof is included and the exposure control operation having preference to the frame rate may be performed.

According to the imaging apparatus or control circuit of the present invention, the frame period is maintained in a standard period until the subject becomes relatively dark. That is, the frame rate is ensured. Also, since a portion of the needed total gain width is controlled by expanding/contracting the exposure time that the frame period is the enlarged period, the gain width of the gain control circuit such as the AGC circuit or the DGC circuit is relatively small and the S/N ratio can be suppressed from deteriorating.

What is claimed is:

1. An imaging apparatus comprising:
    an imaging device that photographs a subject and generates an image signal;
    a driving unit that repeatedly drives the imaging device in a predetermined frame period;
    a signal processing unit that performs predetermined signal processing to the image signal and generates an output image signal; and
    an exposure control unit that feedback-controls a signal level of the output image signal,
    wherein the driving unit expands/contracts an exposure time in a range according to the frame period and increases/decreases an exposure gain,
    the signal processing unit has at least one front-stage gain control circuit for multiplying the image signal by a processing gain in a predetermined range,
    the exposure control unit sets to a total gain of the output image signal according to a product of the exposure gain and the processing gain first to third sections in ascending order,
    in the first section, sets the frame period to a standard period and controls the total gain by increasing/decreasing the exposure gain by the driving unit, in the second section, controls the total gain by increasing/decreasing the processing gain of the at least one front-stage gain control circuit, and in the third section, sets the frame period to an enlarged period larger than the standard period and controls the total gain by increasing/decreasing the exposure gain by the driving unit.

2. The imaging apparatus according to claim 1, wherein the signal processing unit has a rear-stage gain control circuit for multiplying the image signal by a processing gain in a predetermined range, and the exposure control unit controls the total gain by increasing/decreasing the processing gain of the rear-stage gain control circuit in a fourth section subsequent to the third section.

3. An imaging apparatus comprising:

an imaging device that photographs a subject and generates an image signal;

a driving unit that repeatedly drives the imaging device in a predetermined frame period;

a signal processing unit that performs predetermined signal processing to the image signal and generates an output image signal;

an exposure control unit that feedback-controls a signal level of the output image signal according to any one of two predetermined control modes; and a switching unit that switches the control modes, wherein the driving unit expands/contracts an exposure time in a range according to the frame period and increases/decreases an exposure gain, the signal processing unit has a front-stage gain control circuit for multiplying the image signal by a front-stage processing gain in a predetermined range, and a rear-stage gain control circuit for multiplying the image signal by a rear-stage processing gain in a predetermined range, the exposure control unit sets to a total gain of the output image signal according to a product of the exposure gain, the front-stage processing gain, and the rear-stage processing gain first to fourth sections in ascending order with respect to the respective control modes, in a first control mode, in the first section, sets the frame period to a standard period and performs a standard exposure time control operation for controlling the total gain by increasing/decreasing the exposure gain by the driving unit, in the second section, sets the frame period to an enlarged period larger than the standard period and performs an enlarged exposure time control for controlling the total gain by increasing/decreasing the exposure gain by the driving unit, in the third section, performs a front-stage processing gain control for controlling the total gain by increasing/decreasing the front-stage processing gain, and in the fourth section, performs a rear-stage processing gain control for controlling the total gain by increasing/decreasing the rear-stage processing gain, in a second control mode, in the first section, performs the standard exposure time control, in the second section, performs the front-stage processing gain control, in the third section, performs the rear-stage processing gain control, and in the fourth section, performs the enlarged exposure time control.

4. An imaging apparatus comprising:

an imaging device that photographs a subject and generates an image signal;

a driving unit that repeatedly drives the imaging device in a predetermined frame period;

a signal processing unit that performs predetermined signal processing to the image signal and generates an output image signal;

an exposure control unit that feedback-controls a signal level of the output image signal according to any one of two predetermined control modes; and a switching unit that switching the control modes, wherein the driving unit expands/contracts an exposure time in a range according to the frame period and increases/decreases an exposure gain, the signal processing unit has a front-stage gain control circuit for multiplying the image signal by a front-stage processing gain in a predetermined range, and a rear-stage gain control circuit for multiplying the image signal by a rear-stage processing gain in a predetermined range, the exposure control unit sets to a total gain of the output image signal according to a product of the exposure gain, the front-stage processing gain, and the rear-stage processing gain first to fourth sections in ascending order with respect to the respective control modes, in a first control mode, in the first section, sets the frame period to a standard period and performs a standard exposure time control operation for controlling the total gain by increasing/decreasing the exposure gain by the driving unit, in the second section, sets the frame period to an enlarged period larger than the standard period and performs an enlarged exposure time control for controlling the total gain by increasing/decreasing the exposure gain by the driving unit, in the third section, performs a front-stage processing gain control for controlling the total gain by increasing/decreasing the front-stage processing gain, and in the fourth section, performs a rear-stage processing gain control for controlling the total gain by increasing/decreasing the rear-stage processing gain, in a second control mode, in the first section, performs the standard exposure time control, in the second section, performs the front-stage processing gain control, in the third section, performs the enlarged exposure time control, and in the fourth section, performs the rear-stage processing gain control.

5. A control circuit of an imaging device, comprising:

a driving unit that is connected to an imaging device for photographing a subject and generating an image signal and that repeatedly drives the imaging device in a predetermined frame period;

a signal processing unit that is connected to the imaging device, performs predetermined signal processing to the image signal and generates an output image signal; and an exposure control unit that feedback-controls a signal level of the output image signal, wherein the driving unit expands/contracts an exposure time in a range according to the frame period and increases/decreases an exposure gain, the signal processing unit has at least one front-stage gain control circuit for multiplying the image signal by a processing gain in a predetermined range, the exposure control unit sets to a total gain of the output image signal according to a product of the exposure gain and the processing gain first to third sections in ascending order, in the first section, sets the frame period to a standard period and controls the total gain by increasing/decreasing the exposure gain by the driving unit, in the second section, controls the total gain by increasing/decreasing the processing gain of the at least one front-stage gain control circuit, in the third section, sets the frame period to an enlarged period larger than the standard period and controls the total gain by increasing/decreasing the exposure gain by the driving unit.

6. The control circuit of an imaging device according to claim 5, wherein the signal processing unit has a rear-stage gain control circuit for multiplying the image signal by a processing gain in a predetermined range, and the exposure control unit controls the total gain by increasing/decreasing the processing gain of the rear-stage gain control circuit in a fourth section subsequent to the third section.

* * * * *